United States Patent Office 2,708,180
Patented May 10, 1955

2,708,180

CARRYING OUT CATALYTIC REACTIONS WITH HYDROCARBONS IN THE PRESENCE OF HYDROGEN

Wilhelm von Fuener, Willi Oettinger, and Helmut Nonnenmacher, Ludwigshafen (Rhine), and Ortwin Reitz, Heidelberg, Germany, assignors to Badische Anilin- & Soda-Fabrik Aktiengesellschaft, Ludwigshafen (Rhine), Germany No Drawing. Application April 16, 1952,
Serial No. 282,674

Claims priority, application Germany April 17, 1951

6 Claims. (Cl. 196—53)

This invention relates to a new and improved method of carrying out catalytic reactions with hydrocarbons in the presence of hydrogen.

We have found that the nature of the products of catalytic reactions with hydrocarbons, as for example tars, mineral oils, shale oils, or their fractions or oil residues, in the presence of hydrogen under pressure can be improved when, in the preparation of the catalyst carrier, a waterglass solution is mixed with a metal salt solution in the presence of such an amount of an acid substance that the mixture has a pH below 7 and there is added to the mixture, before the commencement of the formation of the gel, an alkaline precipitant, in particular ammonia or compounds of the same. The waterglass solution may also be first mixed with an alkaline precipitant and the metal salt solution added to the mixture in the presence of an acid substance. The catalyst carrier may also be prepared by the simultaneous mixing together of a waterglass solution, an alkaline precipitant and one or more metal salt solutions in the presence of an acid-reacting substance.

As metal salts it is advantageous to employ the sulfates, nitrates, halides or acetates of metals of the 2nd to 8th groups of the periodic system, preferably of aluminum, tin, zinc, titanium, iron, chromium, molybdenum, tungsten, vanadium, nickel, cobalt, magnesium, beryllium, zirconium, cerium or thorium.

Since during the mixing of the waterglass solution with the metal salt solution, the resulting solution must have a pH below 7, free acid is added to the metal salt solution so that it satisfies this condition if it is not already sufficiently acid of itself. The acid may also be added simultaneously but separately from the metal salt solution or directly after the mixing of the metal salt solution with the waterglass solution. It is preferable, however, not to add the acid to the waterglass solution before the mixing of the solutions. After the solutions have been brought together it is important that the mixture should not be given time to form a gel or turbidity, but that the precipitant should be added before the gel or turbidity formation, preferably immediately after the mixing. If the solution is weakly acid, the precipitant must be added immediately after the mixing. In the case of strongly acid solutions, the gel formation does not commence until after a longer time. In this case the precipitant may be added after 1 to 20 minutes, advantageously after 1 to 10 minutes. The precipitation may take place at room or elevated temperature. The amount of precipitant is regulated so that after mixing the solutions the mixture has a neutral or, advantageously, a weakly acid reaction with a pH between about 5.0 and 7.0, in particular between 5.5 and 7.0.

In carrying out the process in practice, preferably continuously, it is preferable to unite the waterglass solution and the metal salt solution, if necessary acidified, for example in a nozzle or a tube with a short mixing zone, and to lead the mixture directly into a container to which the precipitant is simultaneously supplied.

It is advantageous to use solutions of ammonia, ammonium sulfide, ammonium carbonate or the like as the alkaline precipitants. It is not essential to use such an amount of precipitant that the mixture has an alkaline reaction; it is sufficient if the acid is neutralized up to a neutral or weakly acid reaction at which the precipitation of the precipitate occurs immediately.

The precipitated hydrosilicate is filtered, washed, if necessary with alkaline, in particular ammoniacal, washing water, dried at 60° to 110° C. and then heated to higher temperatures, as for example 400° to about 800° C. The precipitate is a loose powder and consists of salts of low molecular silicic acids.

The silicate thus prepared is usually a fine loose powder which can be pressed into shaped pieces, as for example pills. The pieces are heated at temperatures above 350° C., preferably at 400° to 700° C. The pieces so obtained do not disintegrate in water.

The content of silicic acid in the catalyst carrier may amount to 5 to 95%. When the carrier, apart from other components, also contains $SiO_2$ and $Al_2O_3$ and/or $MgO$, relative proportions other than those in natural bleaching earths may be present. The $SiO_2$-content may lie, for example, between 25 to 70% or between 70 and 95%.

Generally speaking silicic acid-containing catalyst carriers are employed which contain aluminum and/or magnesium, zirconium, cerium or other rare earths. They may also contain small amounts of a metal of the iron group. The final catalyst carrier may also be subjected to an aftertreatment with acids, in particular hydrofluoric acid, or metal salt solutions, for example for binding the alkali or for further activation.

Natural bleaching earths or alumina in powdered form may also be added to the catalyst carriers during their preparation. Carbonaceous substances, as for example graphite, polynuclear aromatic hydrocarbons or fatty acids, may be added to the carrier and substantially removed by subsequent heating at 500° to 900° C. The final catalyst carriers may be treated with acids, such as hydrofluoric acid or other mineral acids or low molecular organic acids or provided with a small amount of metal fluorides or silicon fluoride.

The catalyst carriers thus prepared are provided with a compound of a metal of the 5th to the 8th groups (iron and platinum groups) of the periodic system. It is advantageous to employ 0.5 to 25% or more of the oxides of sulfides or molybdenum or tungsten, with reference to the total catalyst. The catalyst preferably also contains oxides or sulfides of chromium, nickel, cobalt or metals of the platinum group, the amount by weight of these compounds generally being less than the weight of the molybdenum and/or tungsten compounds used. The amount chosen may be for example 5 to 95%, in particular 10 to 80%, for example 10 to 70% of the weight of the molybdenum and/or tungsten compound employed. When employing metal compounds having a weak hydrogenating action, as for example compounds of iron or zinc, in large amounts, there may be added thereto small amounts of metal compounds having a strong hydrogenating action, as for example oxides or sulfides of molybdenum, tungsten or chrominum.

The catalyst is then employed according to the invention for the cracking, refining or aromatizing pressure hydrogenation of hydrocarbons, such as petroleums, tars, shale oils and their fractions, as well as for cracking and hydrogenation products. This catalyst is especially well suited for middle oils. The catalyst may also be employed for reformation, dehydrogenation and isomerization.

By pressure hydrogenation we mean the treatment of the said initial materials with hydrogen or gases containing hydrogen at temperatures of 200° to 600° C. and under a pressure of 10 to 1000 atmospheres, in particular 20 or 50 to 700 atmospheres. Amounts of hydrogen of 50 to 5000 litres per kilogram of initial material per hour and throughputs of 0.1 to about 3 volumes of initial material per volume of reaction space per hour are chosen.

The catalysts may also be employed for the improvement of benzines or middle oils, for example by increasing the anti-knock value, by reforming in the presence of hydrogen, dehydrogenation of naphthenes, removal of sulfur, oxygen and/or nitrogen compounds, low pressures, as for example of 2 to 50, in particular 5 to 40, atmospheres being employed. In the dehydrogenation or reforming only a small amount of hydrogen need be used, it being sufficient to return the hydrogen formed during the process. The cracking of oils and fractions of the same in the presence of hydrogen at slightly increased pressure may also be carried out advantageously with the catalyst. When working with pressures up to about 150 atmospheres, the catalyst may be reactivated from time to time.

The initial materials are led through a reaction chamber for example in the liquid phase together with about 1 to 10 cubic metres of hydrogen under a pressure of more than 200 atmospheres, as for example 250 to 800 atmospheres, and a throughput of 0.5 to 2.5 kilograms, in particular 0.6 to 1.2 kilograms, per litre of catalyst volume per hour at temperatures of 450° to 550° C. The process may be carried out in the absence of catalysts or with an addition of small amounts of catalytically-acting or inert substances, as for example compounds of the metals of the 6th or 8th groups of the periodic system, which may be applied to carriers, as for example lignite coke, or large-surfaced substances, as for example silica gel, bleaching earths, kieselguhr or coke. The throughput and temperature are so correlated that more than 30%, preferably more than 40%, of middle oil is freshly formed.

The product obtained by this process, if desired after separating the benzine, is then supplied to a further stage while employing the said catalyst. The process may be simplified by choosing the same pressure for the two stages and allowing the product from the first stage to flow directly into the second, compression energy thus being saved. When working up the initial materials in the sump phase with finely divided catalyst or/and when employing crude oil containing large amounts of asphalt, which contain more than 2% of Holde asphalt, the products of the sump phase hydrogenation are led through a separator vessel into the second stage. The solid substances, such as catalyst, inert substances and ash constituents and/or unconverted high-boiling asphalts, settle in this vessel and can be withdrawn continuously or periodically. Only inconsiderable amounts, for example 1 to 2%, with reference to the initial material, of carbonaceous substances are thus removed.

The second stage is advantageously carried out by leading the entire product of the sump phase hydrogenation together with 2 to 5 cubic metres of hydrogen per kilogram of oil per hour and under a pressure of 200 to 800 atmospheres, in particular 500 to 750 atmospheres, at a temperature of 400° to 550° C., in particular 440° to 520° C., and with a throughput of 0.5 to 1.5 kilograms per litre of reaction space per hour over the said catalyst.

By working in this way about 35 to 60% of benzine is formed by a single passage through the reaction vessel. The higher-boiling fraction, consisting mainly of middle oil, is returned to the second stage until the initial material is completely converted into benzine. If diesel oil is desired as an end product in addition to benzine, a corresponding amount of the middle oil is not returned.

The catalyst may however also be employed with advantage for the direct production of benzine from crude oils or crude oil residues poor in asphalt and rich in hydrogen in a single stage by pressure hydrogenation, the initial materials being led with hydrogen at 400° to 550° C. and pressures of 200 to 800 atmospheres over the catalyst with such throughputs that preferably by a single passage and with a formation of methane and ethane of less than 6% by weight, for example about 2 to 4% (with reference to the initial material introduced), there is in the reaction product at least 35% of benzine and preferably more, for example more than 40% of benzine, but so that a maximum of about 65% of benzine is produced. The fraction boiling above the benzine is returned. There should thus be formed in all from the initial material more than 80% by weight of benzine, as for example 85% and more, or more than 90% of benzine and liquid gas. The throughputs in practice are from 0.2 to 1.5 kilograms per litre of catalyst per hour and in particular 0.5 to 1.2, for example 0.8 to 1.0 kilograms per litre of catalyst per hour. Hydrogen or gas containing the same is used in an amount of 1 to 4, in particular 1.5 to 3.5, cubic metres per kilogram of initial material.

For carrying out the process it is advantageous to choose the optimum amount of catalytically-acting metal compound on the carrier. The lower the pressure is, the greater is the amount of metal compound which the carrier must contain, but at higher pressures it is advantageous to use less of the metal compound. Thus in the working up of oils having a hydrogen content of 12 to 13% and an asphalt content according to Holde below 1% at 200 to 350 atmospheres, a carrier is chosen having 5 to 25%, in particular 12 to 20%, of molybdenum or tungsten compound, and at a pressure between 350 and 800 atmospheres a carrier which is provided with 0.5 to 15%, in particular 3 to 7%, of molybdenum or tungsten compound. In both cases the less good results are obtained with the higher contents of the metal compounds. The addition of chromium, nickel, cobalt or iron compounds is recommended, especially at pressures below 450 atmospheres, and better below 350 atmospheres.

If some diesel oil is desired as well as the benzine, there may be continuously withdrawn from the reaction product about as much middle oil as was contained in the initial material at the start but at the most about 10% by weight more, with reference to the total middle oil content of the end product. Up to a maximum of about 10%, with reference to the middle oil formed, can also be withdrawn when the initial material contains no middle oil. When working in this manner the working conditions should also be chosen so that more than 80%, in particular more than 85%, of the remaining part is converted into benzine or more than 90% into benzine and liquid gas. The content of the gaseous fraction in the reaction chamber is scarcely reduced by this withdrawal of middle oil, which is desirable.

By the said method of working there is established in the reaction chamber a mixed phase of liquid and vaporous or gaseous substances. The reaction conditions are preferably so adjusted, within the abovementioned limits, so that not more than 35% of the initial materials, and better not more than 20%, is present in the reaction chamber in the liquid phase. In order to attain this condition with certainty, it is preferable if necessary to add oils which vaporize entirely under the reaction conditions, as for example middle oils.

It is surprising that in this process the catalysts remain stable for long periods although the initial materials contain high molecular compounds which lead to coke-like residues during the distillation.

The substantial conversion of the oils used according to the present invention into benzine with a simultaneous long life of the catalysts is, however, only achieved with advantage when by a single passage a maximum of about 65% of benzine is produced and when at least 35%, and preferably more, of benzine is contained in the final product. It has been found that if too little benzine is formed, the life of the catalyst is reduced. If more than 65% of benzine is produced, the yield usually falls and there is a risk of coke deposition on the catalyst.

In the known method of working by treating these oils in two stages, whereby they are worked up in the first stage to middle oil while returning the heavy oil and the middle oil is worked up in a further stage to benzine, the life of the catalysts in the first stage is less than in the present process.

In order that the efficiency of the catalysts should not be impaired by deposition of inorganic constituents, in particular in the course of long periods of time, there may be arranged in front of the catalysts, for the purpose of removing ash, pieced, granular or shaped substances, such as clay sherds, Raschig rings of clay or metal, as for example aluminum or the like, the temperature of which is kept in the neighborhood of the reaction temperature.

The following examples will further illustrate this invention but the invention is not restricted to these examples.

*Example 1*

From a German crude oil, 25% of benzine and middle oil are distilled off.

The distillation residue has 1% of lignite coke provided with 10% of iron sulfate added to it and it is led with 1.8 cubic metres of hydrogen per kilogram of residue per hour under a pressure of 700 atmospheres at 475° C. through a high pressure chamber with a throughput of 1 kilogram per litre of reaction space (per hour). After leaving the reaction chamber, the gas and liquid are led into a separator which is under the same pressure and in which a temperature of about 460° C. prevails. From the lower part of the separator there is withdrawn about 1.5 to 2% (with reference to the initial product) of constituents consisting substantially of solid substances. The gaseous and liquid products, which consist of about 16% of benzine boiling up to 180° C., 42% of middle oil boiling up to 350° C. and 42% of heavy oil, are withdrawn from the top of the separator and then pass directly under the same reaction pressure of 700 atmospheres into an adjacent reaction vessel which is filled with a shaped catalyst (prepared as described below). The reaction temperature in this stage is 460° C., the throughput is 1.0 kilogram of oil per litre of catalyst per hour, and the amount of gas 2 cubic metres of hydrogen per kilogram of oil. The liquid product thus obtained consists to the extent of 60% benzine and to the extent of 40% of middle oil and heavy oil. The middle oil and heavy oil are returned to the reaction chamber of the second stage. The benzine obtained by working in this way has an octane number of 70.

The catalyst is prepared as follows:

An acid solution consisting of 750 grams of aluminum nitrate (9.3% by weight of Al₂O₃), 11 grams of ferric chloride, 31 grams of magnesium nitrate

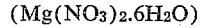

and 160 cubic centimetres of concentrated hydrochloric acid (36%) is added with rapid stirring to 500 cubic centimetres of waterglass solution of the density 1.34 and containing about 26% by weight of SiO₂. The two solutions have a temperature of 90° C. Immediately after the mixing the excess of acid is neutralized by rapidly pouring in 25% ammonia water and the solution brought to alkaline reaction. (The excess of acid can also be neutralized only to a pH of 5 to 6.5.) The silicate precipitate is filtered and washed free from alkali with water. The precipitate can be filtered and washed out easily. The dried, loose, sandy silicate dried at 100° C. shows an ignition loss of 25 to 30% and contains, besides 50% of SiO₂, about 22% of Al₂O₃, 1 to 2% of Fe₂O₃ and about 1% of MgO. The alkali content is below 0.5% of Na₂O.

The powder is shaped in a pill press and consolidated by heating at 450° C. The heated pills have 6% of MoO₃ added thereto, i. e. they are impregnated with ammonium molybdate solution, dried and heated at 400° C. to decompose the ammonium salt.

*Example 2*

A heavy gas oil obtained from German crude oil by distillation and having a specific gravity of 0.835, an aniline point of +72° and a boiling point of 342° C. is led together with 2 cubic metres per kilogram of oil under a pressure of 210 atmospheres and a throughput of 1.2 kilograms of oil per litre of catalyst per hour over a shaped catalyst at a temperature of 390° C.

This catalyst is prepared by diluting 500 cubic centimetres of commercial waterglass solution (specific gravity 1.34) with 2 litres of water, adding thereto a mixture of 750 grams of Al(NO₃)₃ solution (9% with reference to Al₂O₃), 55 grams of sublimed FeCl₃ and 31 grams of MgNO₃.6H₂O, rapidly adding 160 cubic centimetres of hydrochloric acid (36%) and precipitating the mixture immediately after the addition of acid with 500 cubic centimetres of 25% ammonia solution while stirring well. The deposited silicate precipitate, which is easily filterable, is immediately filtered off, washed free from chlorine ions and dried at 100° C. 190 grams of the dried silicate powder are impregnated with 250 cubic centimetres of a solution of 14 grams of ammonium thiotungstate and 10 grams of ammonium sulfide, dried, treated with hydrogen sulfide and hydrogen for 6 hours at 400° C. and then brought into pill moulds in the dry form.

The liquid product obtained consists of 60% of benzine and 40% of middle oil which, together with fresh gas oil, is returned to the reaction chamber and thus converted into benzine. The benzine obtained after distillation has an octane number of 72.

*Example 3*

A Near Eastern crude oil is separated by distillation into 20% of benzine and 80% of benzine-free crude oil.

The benzine-free crude oil is led over a catalyst together with 2.5 cubic metres of hydrogen per kilogram of oil per hour under a pressure of 325 atmospheres with a throughput of 0.55 kilogram per litre of reaction space per hour at a temperature of 440° C.

The composition of the catalyst, measured as anhydrous substance, is 88% of Al₂O₃ and SiO₂ in the ratio by weight of 1:1 and 6% each of ZnO and MoO₃. For its preparation, 750 cubic centimetres of commercial sodium waterglass (specific gravity 1.34) are diluted with 2.5 litres of water, 3640 grams of aluminum nitrate solution (6% with reference to Al₂O₃) are added while stirring, 400 cubic centimetres of hydrochloric acid are added and then precipitation is immediately effected with 750 cubic centimetres of 25% ammonia solution. The silicate precipitate is filtered off, washed free from chlorine ions, dried at 100° C., shaped into pills, consolidated at 400° C. and provided with 6% of ZnO (by impregnation with zinc acetate solution) and 6% of MoO₃ (by impregnation with ammonium molybdate solution) and heating at 400° C.

By a single passage through the reaction chamber, a liquid product is obtained which consists of 50% of benzine and 50% of middle oil. The middle oil is returned to the reaction chamber. In this way the benzine obtained has an octane number of 71.

What we claim is:

1. In a process for carrying out catalytic hydrogenation reactions with hydrocarbons in the presence of hydrogen under pressure at temperatures of 200° to 600° C. while employing catalytically-active metal compounds carried by artificially-prepared silicates, the improvement which comprises carrying out the reaction in the presence of a catalyst the carrier of which is prepared by mixing waterglass solution which is free of gel-forming substances and a solution of a salt of a metal of the 2nd to the 8th groups of the periodic system wherein the metal is present in the cation; providing a pH below 7 in the mixture of waterglass solution and metal salt solution, the conditions being regulated so that neither precipitation nor turbidity occurs in the mixture; and admixing an alkaline precipitant; the waterglass solution, metal salt solution and precipitant being brought together so rapidly that neither precipitation nor turbidity occurs until after all of the said reactants have been brought together and a loose powder precipitate of low molecular weight silicic acid salts of said 2nd to 8th group metal is produced.

2. In a process for carrying out catalytic hydrogenation reactions with hydrocarbons in the presence of hydrogen under pressure at temperatures of 200° to 600° C. while employing catalytically-active metal compounds carried by artificially-prepared silicates, the improvement which comprises carrying out the reaction in the presence of a catalyst the carrier of which is prepared by mixing waterglass solution which is free of gel-forming substances and a solution of a salt of a metal of the 2nd to the 8th groups of the periodic system wherein the metal is present in the cation; providing a pH below 7 in the mixture of waterglass solution and metal salt solution, the acidity in the waterglass solution not being produced before the addition of the metal salt solution and the conditions being regulated so that neither precipitation nor turbidity occurs in the mixture; and admixing an alkaline precipitant; the waterglass solution, metal salt solution and precipitant being brought together so rapidly that neither precipitation nor turbidity occurs until after all of the said reactants have been brought together and a loose powder precipitate of low molecular weight silicic acid salts of said 2nd to 8th group metal is produced.

3. The process of claim 2 wherein the metal salt solution is admixed in the presence of such an amount of an acid-reacting substance that said pH below 7 is provided.

4. The process of claim 2 wherein the waterglass solution and an acidic metal salt solution providing said pH below 7 are mixed in a short mixing zone, and the mixture is led directly into a vessel to which the alkaline precipitant is supplied simultaneously.

5. In a process for carrying out catalytic hydrogenation reactions with hydrocarbons in the presence of hydrogen under pressure at temperatures of 200° to 600° C. while employing catalytically-active metal compounds carried by artificially-prepared silicates, the improvement which comprises carrying out the reaction in the presence of a catalyst the carrier of which is prepared by mixing waterglass solution which is free of gel-forming substances and a solution of an aluminum salt wherein the aluminum is present in the cation; providing a pH below 7 in the mixture of waterglass solution and aluminum salt solution, the acidity in the waterglass solution not being produced before the addition of the aluminum salt solution and the conditions being regulated so that neither precipitation nor turbidity occurs in the mixture; and admixing an alkaline precipitant; the waterglass solution, aluminum salt solution and precipitant being brought together so rapidly that neither precipitation nor turbidity occurs until after all of the said reactants have been brought together and a loose powder precipitate of low molecular weight silicic acid salts of aluminum is produced.

6. The process for producing benzine which comprises hydrogenating a mineral oil with a hydrogen-containing gas at a pressure of about 200 to 800 atmospheres, at a temperature of about 400° to 550° C. and in the presence of an artificially-prepared siliciate carrier provided with a compound of a metal of the 5th to the 8th groups of the periodic system as a catalyst for the reaction, the reaction conditions being effective to produce at least 35% of benzine by weight of said oil in a single passage of the oil over said catalyst, and recycling the fraction obtained that boils above the benzine, said silicate carrier being prepared by: mixing waterglass solution which is free of gel-forming substances and a solution of a salt of a metal of the 2nd to the 8th groups of the periodic system wherein the metal is present in the cation; providing a pH below 7 in the mixture of waterglass solution and metal salt solution, the acidity in the waterglass solution not being produced before the addition of the metal salt solution and the conditions being regulated so that neither precipitation nor turbidity occurs in the mixture; and admixing an alkaline precipitant; the waterglass solution, metal salt solution and precipitant being brought together so rapidly that neither precipitation nor turbidity occurs until after all of the said reactants have been brought together and a loose powder precipitate of low molecular weight silicic acid salts of said 2nd to 8th group metal is produced.

References Cited in the file of this patent

UNITED STATES PATENTS

| | | |
|---|---|---|
| 2,500,197 | Michael et al. | Mar. 14, 1950 |
| 2,548,860 | Bond | Apr. 17, 1951 |